Jan. 2, 1940. W. G. HOLMES 2,185,944
FIRE-DETECTING CABLE
Filed May 26, 1939 2 Sheets-Sheet 1

Inventor
Willis Gerald Holmes
by Roberts, Cushman & Woodbury
Att'ys.

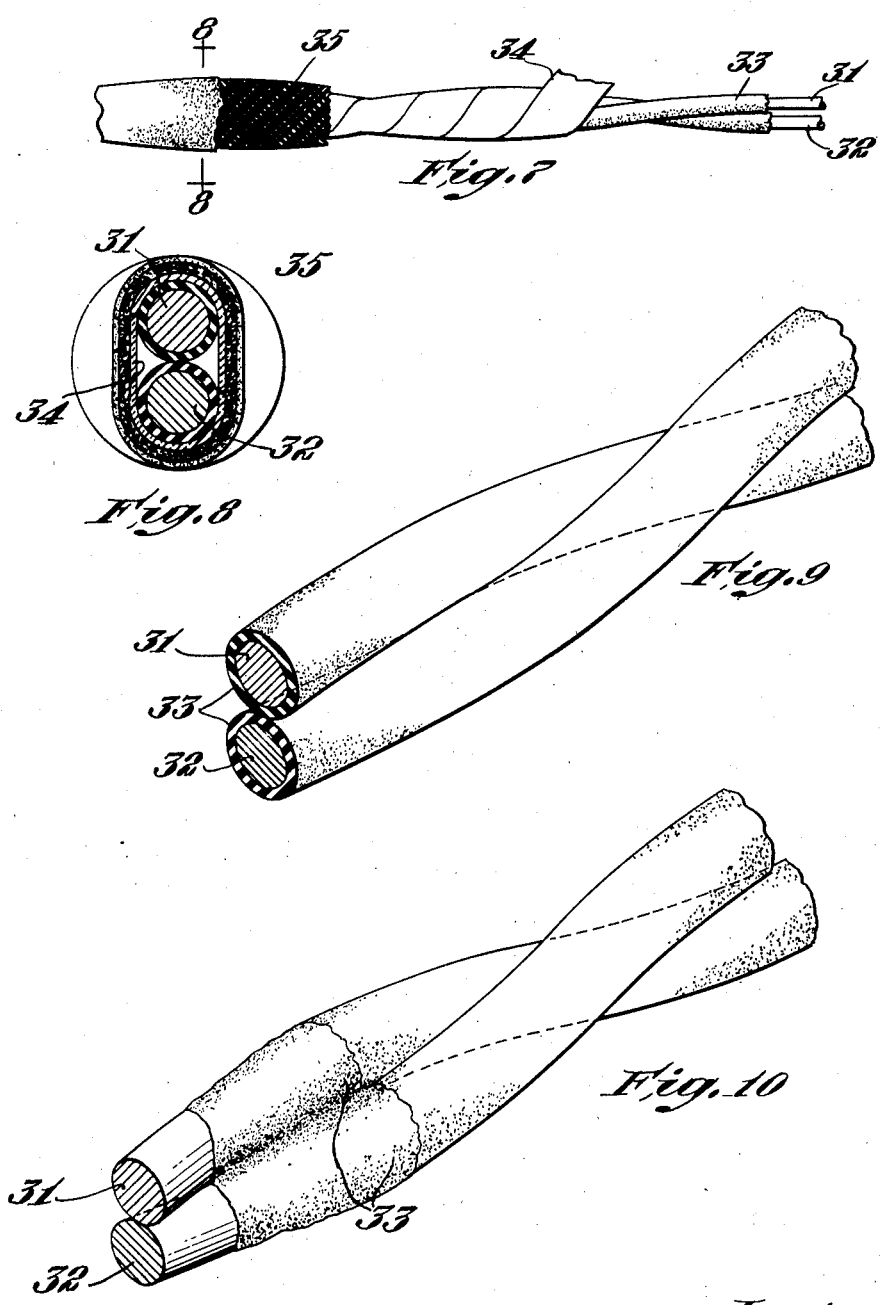

Patented Jan. 2, 1940

2,185,944

UNITED STATES PATENT OFFICE 2,185,944

FIRE-DETECTING CABLE

Willis Gerald Holmes, Pembroke, Mass.

Application May 26, 1939, Serial No. 275,971

4 Claims. (Cl. 200—143)

This invention relates to cables of the type having two or more conductors which are normally insulated from each other but which are intended to move into contact with each other in response to heat, thereby to operate a signal or actuate a sprinkler system. As realized by many prior inventors working in this art such cables, if they can be made reliable in use, have many advantages over other types of fire detecting systems. For example, they can be strung throughout a building either before or after it is finished and, in the case of a finished building, can readily be concealed behind mouldings, etc; and they may be installed by an ordinary electrician without special equipment. However, the many cables of this type which have heretofore been proposed have not proved satisfactory, chiefly for the reason that they are unreliable in use. Most of them have also been expensive to manufacture.

Objects of the present invention are to provide cables of the type referred to which are thoroughly dependable in use, which are inexpensive to manufacture, which can be made with ordinary insulated wire machinery, which can be made to operate at any desired temperature, which do not deteriorate in use and which are generally superior to prior cables of the type referred to.

According to this invention at least one conductor of the cable is helically twisted around another conductor and is formed of spring material to produce a tight pinching action on the intervening insulation throughout the length of the cable, the insulation being formed of material which breaks down in response to heat to permit the conductors to pinch directly together, in combination with means to prevent the conductors from untwisting, thereby to maintain the pinching action throughout the length of the cable. By "helically twisted" I mean that, when the cable is completed, one wire extends around the other wire along a helical path irrespective of whether or not the wire is twisted about its own axis in the process of uniting the conductors together. In the preferred form of the invention the cable comprises only two wires both of which are formed of spring material and both of which are twisted smoothly and continuously like ordinary two-wire telephone cord. With this construction the wires may be rapidly and inexpensively twisted together with an ordinary wire-twisting machine. In uniting the wires they are preferably not twisted beyond their elastic limit so that when released they return to straight condition. By using two spring wires thus twisted together within their elastic limit and held against untwisting they exert a strong pinching action on the intermediate insulation throughout the length of the cable.

While the insulation may be formed of various materials which soften and/or burn when heated, such as wax, pitch, cellulose, latex, rubber, etc., it is preferably formed of thermo-plastic material which, at a predetermined temperature, softens sufficiently to permit the two wires to pinch together in response to said spring action. So far as I now know the best insulation comprises an ethyl cellulose lacquer. The temperature at which the lacquer softens may be controlled by incorporating more or less plasticizer. The lacquer may be applied to either or both wires before they are twisted together by an ordinary wire-coating machine.

The temperature at which the insulation breaks down may be controlled not only by changing the composition of the insulation as above suggested but also by changing the kind or size of the spring wire or the pitch of the twist, that is the length of one complete spiral of one wire about the other, or by changing any two or more of these factors. Other factors being equal the pinching action is increased by increasing the stiffness or size of the wire or by decreasing the pitch of the twist. For most purposes I recommend two steel spring wires, each about .035 in. in diameter and each having a coating about .010 in. in thickness of ethyl cellulose lacquer of medium viscosity when applied, the two wires being twisted with a pitch of about 3 in., that is four complete spirals per foot in each wire. Such a cable will function at about 160° F.

For the purpose of illustration typical embodiments of the invention are shown in the accompanying drawings in which.

Figure 6:
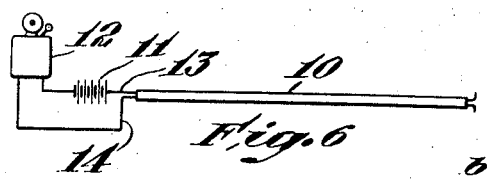

Fig. 6 indicates a simple wiring basis for such a system;

Fig. 7 is a side elevation of a preferred embodiment, showing portions broken away;

Fig. 8 is a section on line 8—8 of Fig. 7;

Fig. 9 is a perspective view, greatly enlarged, showing a short length of the two wires with the insulation intact on each wire but with the covering around both wires removed; and Fig. 10 is a similar view showing a portion of the insulation melted away and illustrating how the two wires pinch together when the insulation melts.

Figure 1:
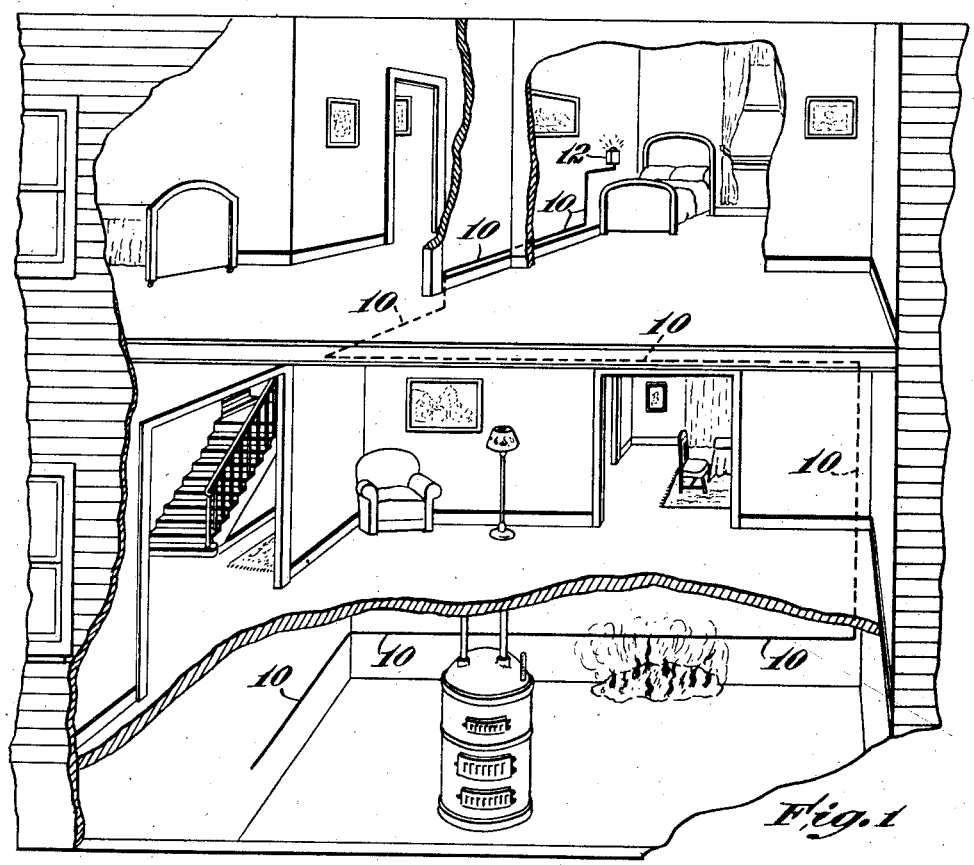
Fig. 1 is a diagrammatic view showing a fire alarm detector circuit in accordance with my invention.

In the diagram of Fig. 1, I have illustrated a building wired with my novel detector alarm. As appears from that figure the fire-detecting cable, indicated generally at 10, may be strung anywhere throughout the premises and at all points along its length constitutes a heat-responsive alarm medium. Such cable is included in a normally open electrical circuit, being connected with any suitable source of electrical energy as the dry cell batteries 11, and with any visible or audible alarm 12, as a bell, buzzer, telephone or telegraph line, or other alarm device.

Figure 2:
Fig. 2 is a fragmentary elevation of a preferred form of a combustibly-armored cable, the armor being partly broken away to expose the cable.
Figure 3:
Fig. 3 is a cross section of the cable shown in Fig. 2.
Figure 5:
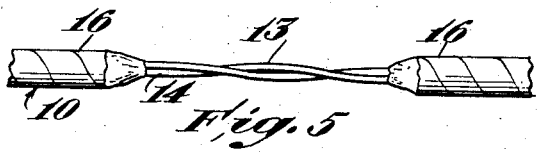
Fig. 5 is a view similar to Fig. 2, particularly illustrating the extended circuit-closing action of the spring conductors when the covering is burned off.

In the form of Figs. 2 and 3, the cable 10 consists of a pair of wires or the like 13 and 14. One of these, as the wire 13, is covered by insulation 15 of some material which softens and/or burns, as beeswax or the like. The other wire 14 may be bare. Either, or both of the wires, may be of spring material, and both wires, after the insulation 15 has been applied, are longitudinally intertwisted upon one another, but, of course, are normally insulated from each other by the insulation 15. In order to prevent the wires from accidentally untwisting, they may be enclosed in an outer covering or armor 16 of readily-combustible material.

Figure 4:
Fig. 4 is a cross section of a modification.

In the form of Fig. 4, each wire 13 and 14 may be individually insulated as at 19 and 20 before intertwisting, and both wires may then be encased in an outer covering or armor 21. In each form, both wires are preferably of spring material. Under certain circumstances, however, it may be sufficient that one wire only be made of spring material.

At whatever point along its length that my cable is attacked by fire, the outer covering, if the cable is provided with such a covering, is first consumed by the fire, after which the inner covering or insulation (15 in Fig. 3, or 19 and 20 in Fig. 4) is consumed. As the insulation 15 or 19 and 20 burns off, the spring wire, or wires, is freed and automatically moves by its spring action into contact with the complementary wire, thereby closing the circuit and sounding the alarm.

The particular embodiment of the invention shown in Figs. 7, 8, 9 and 10 comprises two spring wires 31 and 32 each covered with a coating 33 of ethyl cellulose lacquer, the two wires then being twisted together. After the wires are twisted together they are wrapped spirally with a ribbon of Cellophane 34 or other material adapted to protect the wires from mechanical injury or possible grounding. This material may also serve to hold the wires against untwisting. By employing flame-proof Cellophane this wrapping helps to retard the travel of the flames along the cable in the event the outer covering becomes ignited. Over the wrapping 34 the cable is preferably provided with the usual braided covering 35 and after the braiding is applied the cable is preferably lacquered on the outside to seal the interstices in the braid and generally give finish and protection. If desired an armor covering may be employed in lieu of or in addition to the aforesaid covering. It will also be understood that in protected locations the cable may be used in the uncovered state shown in Figs. 9 and 10, in which case the wires may be prevented from untwisting by causing the insulation coatings on the respective wires to fuse together by the application of heat and/or pressure or by slightly softening the insulation between the two wires with a suitable solvent.

From the foregoing it will be evident that this invention is characterized not only in that at least one of the wires is formed of spring wire which is bent so as to exert a strong pinching action in its constant effort to straighten but also in that the two wires are twisted together in such a way that the pinching action extends continuously throughout the length of the cable and the wires may be intertwisted with an ordinary wire twisting machine such as is commonly employed in making telephone cord. If the wires were twisted together but not formed of spring material, they would take a permanent set with no substantial tendency to move together even though the insulation therebetween is burned away throughout a short length of the cable, but when formed of spring material they pinch together even though the insulation breaks down in one small spot. Consequently if one or both wires were formed of spring material but not twisted together smoothly and continuously the wires would not afford the pinching action continuously throughout the length of the cable and the cable could not be made inexpensively on ordinary wire machinery.

It should be understood that the present disclosure is for the purpose of illustration only and that this invention includes all modifications and equivalents which fall within the scope of the appended claims.

I claim:

1. A cable of the type referred to comprising two conductors and insulation therebetween, at least one of the conductors being helically twisted around the other conductor and being formed of spring material to produce a tight pinching action on said insulation continuously throughout the length of the cable, the insulation being formed of material which breaks down in response to heat to permit the conductors to pinch together, and means restraining the conductors from untwisting, thereby to maintain said pinching action throughout the length of the cable.

2. A cable of the type referred to comprising two conductors helically twisted together with insulation therebetween, the conductors being formed of spring material to produce a tight pinching action on said insulation throughout the length of the cable, the insulation being formed of material which breaks down in response to heat to permit the conductors to pinch together, and means restraining the conductors from untwisting, thereby to maintain said pinching action throughout the length of the cable.

3. A cable of the type referred to comprising two conductors and insulation therebetween, at least one of the conductors being helically twisted around the other conductor and being formed of spring material to produce a tight pinching action on said insulation continuously throughout the length of the cable, the insulation being formed of thermoplastic material which softens in response to heat to permit the conductors to pinch together, and a covering for the conductors and insulation, the covering maintaining said pinching action throughout the length of the cable by preventing the conductors from untwisting.

4. A cable of the type referred to comprising two conductors and insulation therebetween, at least one of the conductors being helically twisted around the other conductor and being formed of spring material to produce a tight pinching action on said insulation continuously throughout the length of the cable, the insulation being formed of material which breaks down in response to heat to permit the conductors to pinch together.

WILLIS GERALD HOLMES.